(No Model.)

P. K. DEDERICK.
BINDING BALES OF PRESSED HAY, COTTON, &c.

No. 275,366. Patented Apr. 10, 1883.

Witnesses:
W. C. Johnston
Fred F. Church

Inventor:
Peter K. Dederick
by
Melville Church
his Attorney.

UNITED STATES PATENT OFFICE.

PETER K. DEDERICK, OF LOUDONVILLE, NEW YORK.

BINDING BALES OF PRESSED HAY, COTTON, &c.

SPECIFICATION forming part of Letters Patent No. 275,366, dated April 10, 1883.

Application filed March 2, 1883. (No model.)

*To all whom it may concern:*

Be it known that I, PETER K. DEDERICK, of Loudonville, in the county of Albany and State of New York, have invented certain new and useful Improvements in Binding Bales of Pressed Hay, Cotton, &c.; and I do hereby declare the following to be a full, clear, and exact description of the same, reference being had to the accompanying drawings, forming part of this specification, and to the figures and letters of reference marked thereon.

In binding bales of hay and cotton as heretofore each band is put around separately and secured by itself, whereas by my improved method I use a continuous wire to take the place of two or more bands, so that it operates as connected bands in adjusting and adapting to the uneven or unequal strain of the bale on the bands. The manner of applying the continuous bands to the bale may be varied, and either wire, rope, band-iron, or other suitable material may be used.

Figure 2:
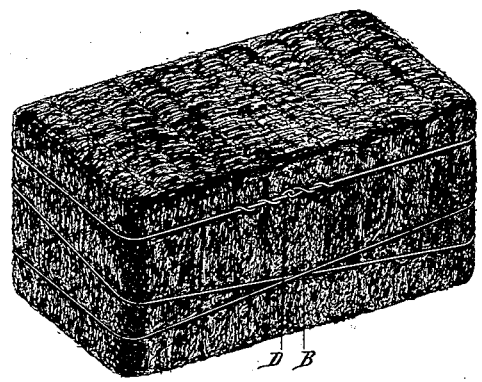
Figure 1:
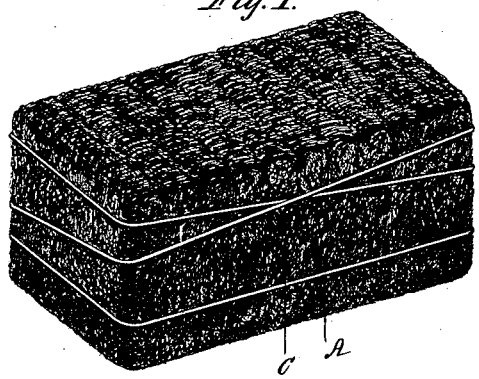

Figures 1 and 2 represent one method of applying my improvement, which for economy of wire I think excels. In this instance I have shown a single wire and the form of bale bound endwise; but the improvement is equally well adapted to bales bound crosswise or the short way around the bale, and where numerous bands are now used two or more continuous bands may be used, if preferred to a single one.

In the drawings, Figs. 1 and 2 represent opposite sides of the bale.

A represents the center of the continuous wire, the ends being passed around the ends of the bale, as shown in Fig. 1, and on the opposite side of the bale (shown in Fig. 2) these ends of the wire cross each other at B, from whence they again pass around the ends of the bale and cross each other again, as shown in Fig. 1 at C, and from thence around the ends of the bale again, and the ends of the wire or other fastening secured together in any manner, as at D, Fig. 2. The bands may run straight at the sides and cross at the ends of the bale, or run diagonal at the ends or sides, or both, without a cross. Any method of winding the band around the bale will answer, so that two or more strands or winds securing different portions of the bale form a continuous band.

It is a well-known fact that where the bale is bound with independent bands some bands receive much more strain than others, owing to the unequal expansive force in different portions of the bale, and as it is uncertain where this expansive force will occur, all the bands must be proportionately stronger to meet it, as if one breaks the next will receive the entire expansive force that was sustained by the two, and will be likely to break also. Hence the bands securing a bale must have a great surplus strength and weight of stock and increased cost as compared with my improved band, which renders it so that the expansive force is borne equally by the band securing the bales at different points, thus causing a saving of from twenty-five to fifty per cent. in cost of stock for bands, besides diminishing the number of fastenings, thereby saving labor and the wire consumed in fastenings.

Having thus fully described my invention, I claim as new and desire to secure by Letters Patent—

A pressed bale of hay, straw, cotton, or other similar material bound or secured by means of a continuous wire, substantially in the manner set forth.

PETER K. DEDERICK.

Witnesses:
WILL A. ALEXANDER,
R. J. VAN SCHOONHOVEN.